United States Patent

Lacroix et al.

Patent Number: 6,033,445
Date of Patent: Mar. 7, 2000

[54] DYE MIXTURES AND THEIR USE

[75] Inventors: Roger Lacroix, Village-Neuf; Jean-Marie Adam, Rosenau, both of France

[73] Assignee: Ciba Specialty Chemicals Corporation, Tarrytown, N.Y.

[21] Appl. No.: 09/208,131

[22] Filed: Dec. 9, 1998

Related U.S. Application Data

[63] Continuation-in-part of application No. 09/021,326, Feb. 10, 1998.

[30] Foreign Application Priority Data

Feb. 10, 1997 [CH] Switzerland ................................ 285/97
Dec. 10, 1997 [EP] European Pat. Off. .............. 97810962

[51] Int. Cl.$^7$ ............................ C09B 1/34; C09B 67/22; D06P 3/06
[52] U.S. Cl. ...................... 8/643; 8/676; 8/679; 552/229; 552/230; 552/231; 552/238; 552/924
[58] Field of Search ................................ 8/924, 643, 676, 8/679; 552/229, 231

[56] References Cited

U.S. PATENT DOCUMENTS

| | | | |
|---|---|---|---|
| 2,314,356 | 3/1943 | Lee et al. ................................. | 260/371 |
| 3,963,430 | 6/1976 | Nonn et al. .................................... | 8/39 |
| 3,995,997 | 12/1976 | Boehmke et al. ............................ | 8/84 |
| 4,014,646 | 3/1977 | Tullio ........................................... | 8/39 |
| 4,115,379 | 9/1978 | Perrey et al. ............................. | 260/163 |
| 4,396,393 | 8/1983 | Schaetzer et al. .......................... | 8/643 |
| 4,402,704 | 9/1983 | Raisin et al. ................................ | 8/641 |
| 4,445,905 | 5/1984 | Schaetzer et al. . | |
| 4,537,598 | 8/1985 | Schaetzer et al. . | |
| 4,582,897 | 4/1986 | Mäusezahl et al. ..................... | 534/783 |
| 5,092,905 | 3/1992 | Doré ............................................. | 8/638 |
| 5,131,919 | 7/1992 | Mäusezahl .................................... | 8/643 |
| 5,416,227 | 5/1995 | Tanner et al. ........................... | 552/232 |
| 5,630,851 | 5/1997 | Jordine et al. ............................... | 8/641 |

FOREIGN PATENT DOCUMENTS

| | | |
|---|---|---|
| 631379 | 4/1963 | Belgium . |
| 0042357 | 12/1981 | European Pat. Off. . |
| 0083299 | 7/1983 | European Pat. Off. . |
| 0445075 | 9/1991 | European Pat. Off. . |
| 0651028 | 5/1995 | European Pat. Off. . |
| 0658605 | 6/1995 | European Pat. Off. . |
| 2341293 | 3/1975 | Germany . |
| 1507088 | 4/1978 | United Kingdom . |

OTHER PUBLICATIONS

Chem. Abstr., vol. 61, 8464 for BE 631379.

*Primary Examiner*—Margaret Einsmann
*Attorney, Agent, or Firm*—Kevin T. Mansfield

[57] ABSTRACT

Concentrated aqueous dye solutions, which comprise 5 to 50% by weight of at least one dye of formula (1)

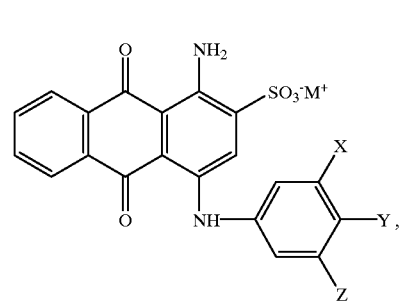

wherein

X and Y are each independently of the other hydrogen or $C_1$–$C_4$alkyl or $C_1$–$C_4$alkoxy, and Z is $C_2$–$C_6$alkanoylamino or $C_2$–$C_4$hydroxyalkylsulfamoyl, $M^+$ is the ammonium cation

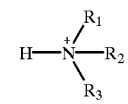

of an amine of formula

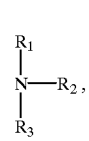

(2)

wherein $R_1$ and $R_2$ are each independently of the other hydrogen, $C_1$–$C_6$alkyl, or hydroxy- or amino-substituted $C_2$–$C_6$alkyl which may be interrupted by an oxygen atom, and $R_3$ is hydroxy- or amino-substituted $C_2$–$C_6$alkyl which may be interrupted by an oxygen atom, with the proviso that $R_1$, $R_2$ and $R_3$ are not a radical of formula —$CH_2$—CH(OH)—$CH_3$ if X and Y are methyl and Z is 2-hydroxyethylsulfamoyl or if X and Y are hydrogen and Z is propionylamino, have good storage stability and give dyeing having good fastness properties on hydroxyl group-containing or nitrogen-containing fibre materials.

13 Claims, No Drawings

DYE MIXTURES AND THEIR USE

This application is a Continuation-In-Part of U.S. patent application Ser. No. 09/021,326, filed Sep. 10, 1998, now pending.

The present invention relates to mixtures of dyes, and their use for the dyeing or printing of nitrogen-containing or hydroxyl group-containing fibre materials.

The object on which the present invention was based was to find dye mixtures which are suitable for dyeing or printing nitrogen-containing or hydroxyl group-containing fibre materials, in particular natural or synthetic polyamide fibre materials, have good fastness properties and, in particular, a good solubility and good printing paste stability.

It has now been found that the dye mixtures below largely satisfy these requirements.

The present invention relates to dye mixtures which contain a dye of the formula

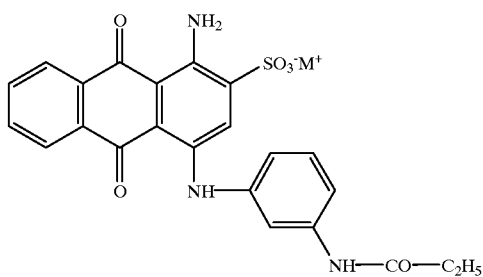

(1)

together with a dye of the formula

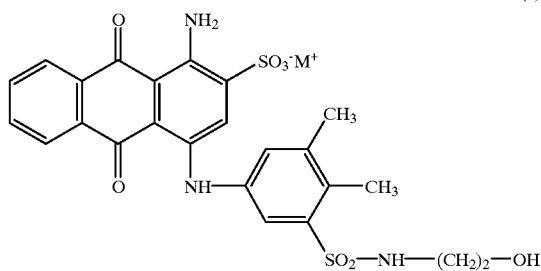

(2)

in which $M^+$ in the dyes of the formulae (1) and (2) are ammonium cations

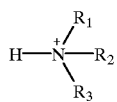

which are identical to or different from one another, of an amine of the formula

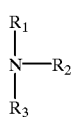

(3)

where $R_1$ and $R_2$ independently of one another are hydrogen, $C_1$–$C_6$alkyl or $C_2$–$C_6$alkyl substituted by hydroxyl or amino and, if appropriate, interrupted by an oxygen atom and $R_3$ is $C_2$–$C_6$alkyl substituted by hydroxyl or amino and, if appropriate, interupted by an oxygen atom.

A suitable $C_1$–$C_6$alkyl for $R_1$ and $R_2$ is in particular $C_1$–$C_4$alkyl, for example methyl or ethyl.

A suitable $C_2$–$C_6$alkyl for $R_1$, $R_2$ and $R_3$, which is substituted by hydroxyl or amino and, if appropriate, interrupted by an oxygen atom, is in particular corresponding $C_2$–$C_4$alkyl radicals, for example —$CH_2CH_2OH$, —$CH_2$—$CH(OH)$—$CH_3$, —$CH_2CH_2NH_2$ or —$(CH_2)_2$—O—$(CH_2)_2$—OH.

$R_1$ is preferably hydrogen, methyl, ethyl, $C_2$–$C_3$alkyl substituted by hydroxyl or a radical of the formula —$(CH_2)_2$—O—$(CH_2)_2$—OH.

$R_1$ is particularly preferably $C_2$–$C_3$alkyl substituted by hydroxyl or a radical of the formula —$(CH_2)_2$—O—$(CH_2)_2$—OH.

$R_1$ is very particularly preferably propyl substituted by hydroxyl, in particular a radical of the formula —$CH_2$—$CH(OH)$—$CH_3$.

$R_2$ is preferably hydrogen, methyl, ethyl, $C_2$–$C_3$alkyl substituted by hydroxyl or a radical of the formula —$(CH_2)_2$—O—$(CH_2)_2$—OH.

$R_2$ is particularly preferably $C_2$–$C_3$alkyl substituted by hydroxyl or a radical of the formula —$(CH_2)_2$—O—$(CH_2)_2$—OH.

$R_2$ is very particularly preferably propyl substituted by hydroxyl, in particular a radical of the formula —$CH_2$—$CH(OH)$—$CH_3$.

$R_3$ is preferably $C_2$–$C_3$alkyl substituted by hydroxyl or a radical of the formula —$(CH_2)_2$—O—$(CH_2)_2$—OH.

$R_3$ is particularly preferably propyl substituted by hydroxyl, in particular a radical of the formula —$CH_2$—$CH(OH)$—$CH_3$.

$R_2$ and $R_3$ independently of one another are preferably $C_2$–$C_3$alkyl substituted by hydroxyl or a radical of the formula —$(CH_2)_2$—O—$(CH_2)_2$—OH, in particular propyl substituted by hydroxyl and preferably radicals of the formula —$CH_2$—$CH(OH)$—$CH_3$.

$R_1$, $R_2$ and $R_3$ independently of one another are particularly preferably $C_2$–$C_3$alkyl substituted by hydroxyl or a radical of the formula —$(CH_2)_2$—O—$(CH_2)_2$—OH, in particular propyl substituted by hydroxyl and preferably radicals of the formula —$CH_2$—$CH(OH)$—$CH_3$.

Of particular interest are dye mixtures which, based on the total amount of the dyes of the formulae (1) and (2), contain at least 5 per cent by weight, preferably at least 10 per cent by weight and in particular at least 15 per cent by weight, of a dye of the formula (2).

The present invention furthermore relates to dyes of the formula (1) and dyes of the formula (2), the meanings and preferences indicated above applying for $R_1$, $R_2$ and $R_3$.

Dyes of the formulae (1) and (2) can be obtained, for example, by reacting 1-amino-4-bromo-anthraquinone-2-sulfonic acid with 3-propionamidoaniline or 5-amino-1,2-xylene-3-sulfo-2'-hydroxyethylamide, and then reacting with an amine of the formula (3). The first reaction is preferably carried out in aqueous solution at a temperature of, for example, 50 to 100° C., in particular 65 to 85° C., in the presence of a base, for example, sodium hydrogencarbonate and a catalyst, for example, a mixture of copper and copper chloride. The reaction with an amine of the formula (3) is carried out, for example, by neutralization of an aqueous dye solution with the corresponding amine.

Mixtures of the dyes of the formulae (1) and (2) can be obtained, for example, by mixed synthesis, 1-amino-4-bromoanthraquinone-2-sulfonic acid being reacted with an appropriate mixture of 3-propionamidoaniline and 5-amino-1,2-xylene-3-sulfo-2'-hydroxyethylamide. The reaction with an amine of the formula (3) can be carried out as indicated above.

The dye mixtures according to the invention can furthermore also be prepared by mixing of the individual dyes. This mixing process is carried out, for example, in suitable mills, e.g. ball and pinned-disc mills, and also in kneaders or mixers. The dye mixtures can furthermore be prepared, for example, by spray drying of the aqueous dye mixtures.

The present invention furthermore relates to concentrated aqueous solutions of dyes, which contain 5 to 50% by weight, in particular 10 to 50% by weight and preferably 20 to 50% by weight, based on the total weight of the solution, of a dye of the formula (1) or (2) or in particular of a dye mixture of the dyes of the formulae (1) and (2).

The concentrated aqueous solutions according to the invention can contain further additives, for example urea, caprolactam, N-methylpyrrolidone or polyethylene glycol. The concentrated aqueous solutions according to the invention can furthermore also contain substances inhibiting fungal and/or bacterial growth.

The dye solutions according to the invention furthermore have a good hard water resistance and they can be diluted with water in any desired ratio, for example in the preparation of the dye liquor, without the dissolved dyes precipitating.

The dye mixtures and dyes according to the invention can be used in the customary dyeing or printing processes. Apart from water and the dyes, the dye liquors or printing pastes can contain further additives, for example wetting agents, antifoam agents, levelling agents or agents affecting the properties of the textile material, for example softening agents, additives for flameproof finishing or dirt-, water- and oil-repelling agents and water-softening agents and natural or synthetic thickeners, for example alginates and cellulose ethers.

The dye mixtures and dyes according to the invention are also suitable for dyeing short liquors, for example in continuous dyeing processes or batchwise and continuous foam-dyeing processes.

The dye mixtures and dyes according to the invention are distinguished in particular by good exhaust properties, good solubility and printing paste stability and also by good combining ability. Furthermore, the dye mixtures and dyes according to the invention have a good storage stability, their concentrated solutions, for example, being stable on storage for several months at a temperature from −5 to +40° C.

Level dyeings with good general fastnesses, in particular good rubbing fastness, wet fastness, wet rubbing fastness and light fastness, are obtained.

The dye mixtures and dyes according to the invention are suitable for dyeing or printing hydroxyl group-containing or nitrogen-containing fibre material. They are particularly suitable for dyeing or printing natural polyamide materials, for example wool, or in particular synthetic polyamide materials, for example polyamide 6 or polyamide 6.6, or silk, and are also suitable for dyeing or printing mixed fabrics or yarns made of wool and synthetic polyamide.

The material mentioned, in particular textile material, can in this case be present in very different processing forms, for example as a fibre, yarn, knitted fabric or woven fabric and in particular in the form of carpets.

In the following examples, parts are parts by weight. The temperatures are degrees Celsius. The relationship between parts by weight and parts by volume is the same as that between the gram and cubic centimetre.

EXAMPLE 1

880 parts of water are introduced into a sulfonating flask and 382 parts of 1-amino-4-bromoanthraquinone-2-sulfonic acid, 138 parts of 3-propionamidoaniline and 51.2 parts of 5-amino-1,2-xylene-3-sulfo-2'-hydroxyethylamide are introduced. After addition of 201 parts of sodium hydrogencarbonate, the mixture is warmed to a temperature of 75° C. 1 part of copper and 1 part of copper chloride are then added with continuous stirring. After about 6 hours, the reaction is complete. 2180 parts of water and 125 parts of sodium sulfate are added, the temperature falling to 50° C. The pH is adjusted to a value of 5 to 6 using 75 parts of sulfuric acid (60%) and 188 parts of sodium sulfate are added. The product obtained is filtered off with suction through a suction filter and washed with a warm solution of 245 parts of sodium chloride in 4780 parts of water. 860 parts of a still moist product are obtained, which contains the dyes of the formulae

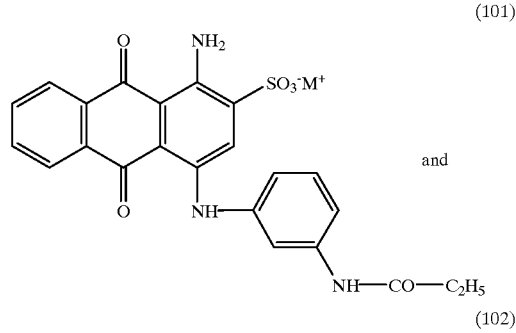

and

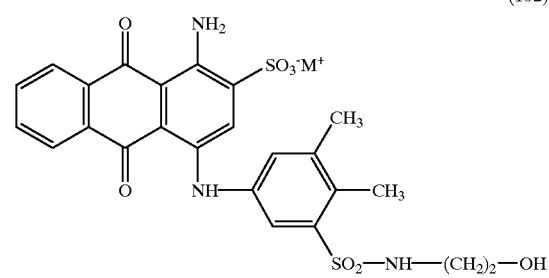

as sodium salts in a weight ratio of 80:20.

100 parts of the product thus obtained, which contains 64% by weight of dye and 36% by weight of water, are suspended in 600 parts of water and warmed to a temperature of 80 to 90° C. with vigorous stirring. 35 parts of hydrochloric acid (32%) are then added dropwise and the mixture is stirred at a temperature of 85° C. for 30 minutes. The suspension is then filtered off with suction while still hot, washed with 100 parts of hydrochloric acid (4%) and well pressed off. About 115 parts of a moist product which are suspended in 70 parts of demineralized water are obtained. This paste is then neutralized with 40 parts of aqueous triisopropanolamine (66%) at a pH of 7 to 7.2. 0.7 part of a commercially available bactericide is then added and the dye solution is subjected to clarifying filtration. The composition of this liquid formulation is as follows:

37.7% by weight of a mixture of the dyes of the formulae (1) and (2) as salts of triisopropanolamine, the weight ratio of the dyes being as indicated above, 0.3 part of a commercially available bactericide and 62% by weight of water.

The formulation obtained is stable on storage at a temperature of −5 to +40° C. and dyes polyamide fabric in blue colour shades.

EXAMPLE 2

880 parts of water are initially introduced into a sulfonating flask and 382 parts of 1-amino-4-bromoanthraquinone-2-sulfonic acid, 138 parts of 3-propionamidoaniline and 51.2 parts of 5-amino-1,2-xylene-3-sulfo-2'-hydroxyethylamide are introduced. After addition of 201 parts of sodium hydrogencarbonate, the mixture is warmed to a temperature of 75° C. 1 part of copper and 1 part of copper chloride are then added with continuous stirring. After about 6 hours the reaction is complete. 2180 parts of water and 345 parts of 32% HCl are added. The mixture is stirred at 80° C. for a further 30 minutes and the product obtained is filtered off with suction through a suction filter and washed with a warm solution of 25 parts of HCl in 800 parts of water. 840 parts of a still moist product which contains the dyes of the formulae (101) and (102) as free acids (M=H) in a weight ratio of 80:20 are obtained. 100 parts of the moist product are suspended in 70 parts of demineralized water. This paste is then neutralized at a pH of 7 to 7.2 with 40 parts of aqueous triisopropanolamine (66%). 0.7 part of a commercially available bactericide is then added and the dye solution is subjected to clarifying filtration. The composition of this liquid formulation is as follows:

37.7% by weight of a mixture of the dyes of the formulae (1) and (2) as salts of triisopropanolamine, the weight ratio of the dyes being as indicated above, 0.3 part of a commercially available bactericide and 62% by weight of water.

The formulation obtained is stable on storage at a temperature of −5 to +40° C. and dyes polyamide fabric in blue colour shades.

Dyeing procedure I 10 parts of polyamide-6,6 fabric are dyed in 500 parts of an aqueous liquor which contains 2 g/l of ammonium acetate and is adjusted to pH 5 using acetic acid. The content of the liquid formulation according to Example 1 is 2%, based on the fibre weight. The dyeing time at a temperature of 98° C. is 30 to 90 minutes. The dyed polyamide-6,6 fabric is then taken out and washed and dried in the customary manner.

Dyeing procedure II 10 parts of polyamide-6,6 fabric are dyed in 500 parts of an aqueous liquor which contains 1 g/l of monosodium phosphate and is adjusted to pH 6 using disodium phosphate. The content of the liquid formulation according to Example 1 is 2%, based on the fibre weight. The dyeing time at a temperature of 98° C. is 30 to 90 minutes. The dyed polyamide-6,6 fabric is then taken out and washed and dried in the customary manner.

Dyeing procedure III 10 parts of wool pieces are dyed in 500 parts of an aqueous liquor. Based on the fibre weight, the liquor contains 2% of the liquid formulation according to Example 1, 5% of Glauber's salt calc. and 2% of 80% acetic acid. The dyeing time at a temperature of 98° C. is 30–60 minutes.

The present invention relates to concentrated aqueous solutions of blue-dyeing anthraquinone dyes, to a process for their preparation and to their use for dyeing or printing hydroxyl group-containing or nitrogen-containing fibre material.

Dye solutions have a number of advantages over solid commercial forms, such as powder or granules, including for example no formation of dust when the dye liquors or printing pastes are prepared, no wetting problems caused by formation of lumps, no mottled dyeings owing to insufficiently dissolved dye particles. Not least because of these advantages, combined with the good meterability of the liquid commercial form, liquid formulations are now increasingly available on the market, the trend moving towards ever more concentrated solutions as they allow substantial savings in transport and storage costs.

However, the storability of dye solutions in general and in concentrated preparations in particular is frequently problematical. The more concentrated a dye solution, the more readily do recrystallisations occur during storage, and more or less large agglomerates form which, for example when such preparations are used in textile printing, are extremely marring in the form of specks, or which plug or contaminate e.g. pipelines, pumps or valves of the transport, metering or dyeing appliances used. In addition, a solid sediment often forms which can be stirred up only with difficulty. In such cases it is often impossible to dissolve the dye again.

Accordingly, this invention has for its object to provide concentrated aqueous solutions of blue-dyeing anthraquinone dyes where the above problems can largely be avoided.

This invention therefore relates to concentrated aqueous dye solutions, which comprise 5 to 50% by weight, based on the total weight of the solution, of at least one dye of formula (1)

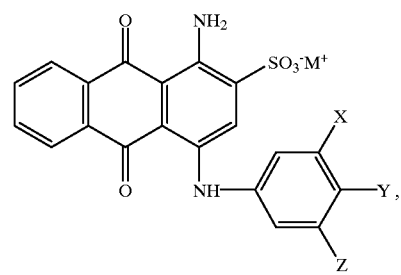

wherein

X and Y are each independently of the other hydrogen or $C_1$–$C_4$alkyl or $C_1$–$C_4$alkoxy, and Z is $C_2$–$C_6$alkanoylamino or $C_2$–$C_4$hydroxyalkylsulfamoyl, $M^+$ is the ammonium cation

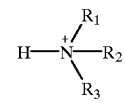

of an amine of formula

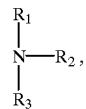

wherein $R_1$ and $R_2$ are each independently of the other hydrogen, $C_1$–$C_6$alkyl, or hydroxy- or amino-substituted $C_2$–$C_6$alkyl which may be interrupted by an oxygen atom, and $R_3$ is hydroxy- or amino-substituted $C_2$–$C_6$alkyl which may be interrupted by an oxygen atom, with the proviso that $R_1$, $R_2$ and $R_3$ are not a radical of formula —$CH_2$—CH(OH)—$CH_3$ if X and Y are methyl and Z is 2-hydroxyethylsulfamoyl or if X and Y are hydrogen and Z is propionylamino.

X and Y defined as $C_1$–$C_4$alkyl are suitably each independently of the other e.g. methyl, ethyl, propyl, isopropyl, butyl, sec-butyl, tert-butyl or isobutyl, in particular methyl or ethyl and, preferably, methyl.

X and Y defined as $C_1$–$C_4$alkoxy are suitably each independently of the other e.g. methoxy, ethoxy, propoxy, isopropoxy, butoxy or isobutoxy, in particular methoxy or ethoxy and, preferably, methoxy.

Z defined as $C_2$–$C_6$alkanoylamino is typically acetylamino, propionylamino, butyrylamino, pentanoylamino or hexanoylamino and, preferably, $C_2$–$C_4$alkanoylamino, such as acetylamino, propionylamino or butyrylamino and, in particular, acetylamino or propionylamino.

Z defined as $C_2$–$C_4$hydroxyalkylsulfamoyl is typically 2-hydroxyethylsulfamoyl, 2- or 3-hydroxypropylsulfamoyl or 2-, 3-, or 4-hydroxybutylsulfamoyl and, preferably, 2-hydroxyethylsulfamoyl.

$R_1$ and $R_2$ defined as $C_1$–$C_6$alkyl are suitably each independently of the other typically methyl, ethyl, propyl, isopropyl, butyl, sec-butyl, tert-butyl, isobutyl, pentyl or hexyl and, preferably, $C_1$–$C_4$alkyl, such as methyl or ethyl.

$R_1$, $R_2$ and $R_3$ defined as hydroxy- or amino-substituted $C_2$–$C_6$alkyl which may be interrupted by an oxygen atom are suitably each independently of one another typically radicals of formulae —$CH_2CH_2OH$, —$CH_2$—$CH(OH)$—$CH_3$, —$CH_2CH_2NH_2$, —$(CH_2)_2$—O—$(CH_2)_2$—OH, —$(CH_2)_2$—O—$CH_2$—$CH_2$—OH or —$(CH_2)_2$—O—$CH_2$—$CH(CH_3)$—OH and, preferably, —$CH_2CH_2OH$, —$CH_2$—$CH(OH)$—$CH_3$ or —$(CH_2)_2$—O—$CH_2$—$CH(CH_3)$—OH.

The novel concentrated aqueous dye solutions can comprise other additives, for example urea, caprolactam, N-methylpyrrolidone or polyethylene glycol.

In a preferred embodiment of this invention, the novel dye solutions comprise caprolactam or N-methylpyrrolidone, preferably caprolactam.

In the novel dye solutions, the cited additives are present in amounts from 0.01 to 30% by weight, preferably from 0.1 to 20% by weight and, more preferably, from 1 to 20% by weight, based on the total weight of the dye solution.

The novel concentrated aqueous solutions may furthermore comprise fungistatic and/or bacteriostatic substances.

Preferred dye solutions are those, wherein X and Y are each independently of the other hydrogen or methyl, and Z is $C_2$–$C_4$alkanoylamino or $C_2$–$C_4$hydroxyalkylsulfamoyl and, preferably, acetylamino, propionylamino or 2-hydroxyethylsulfamoyl.

In a preferred embodiment of the novel dye solutions, $R_1$ is hydrogen, methyl, ethyl, hydroxy-substituted $C_2$–$C_3$alkyl or a radical of formula —$(CH_2)_2$—O—$CH_2$—CHR—OH, wherein R is hydrogen or methyl.

In a particularly preferred embodiment of the novel dye solutions, $R_1$ is hydroxy-substituted $C_2$–$C_3$alkyl or a radical of formula —$(CH_2)_2$—O—$CH_2$—CHR—OH, wherein R is hydrogen or methyl, preferably methyl.

In a very particularly preferred embodiment of the novel dye solutions, $R_1$ is hydroxy-substituted propyl, in particular a radical of formula —$CH_2$—CH(OH)—$CH_3$.

$R_2$ is preferably hydrogen, methyl, ethyl, hydroxy-substituted $C_2$–$C_3$alkyl or a radical of formula —$(CH_2)_2$—O—$CH_2$—CHR—OH, wherein R is hydrogen or methyl.

$R_2$ is particularly preferably hydroxy-substituted $C_2$–$C_3$alkyl or a radical of formula —$(CH_2)_2$—O—$CH_2$—CHR—OH, wherein R is hydrogen or methyl, preferably methyl.

$R_2$ is very particularly preferably hydroxy-substituted propyl, in particular a radical of formula —$CH_2$—CH(OH)—$CH_3$.

$R_3$ is preferably hydroxy-substituted $C_2$–$C_3$alkyl or a radical of formula —$(CH_2)_2$—O—$CH_2$—CHR—OH, wherein R is hydrogen or methyl, preferably methyl.

$R_3$ is particularly preferably hydroxy-substituted propyl, in particular a radical of formula —$CH_2$—CH(OH)—$CH_3$.

Preferred dye solutions are those, wherein $R_2$ and $R_3$ are each independently of the other hydroxy-substituted $C_2$–$C_3$alkyl or a radical of formula —$(CH_2)_2$—O—$CH_2$—CHR—OH, wherein R is hydrogen or methyl, preferably methyl.

$R_1$, $R_2$ and $R_3$ defined as a hydroxy-substituted $C_2$–$C_3$alkyl radical are preferably 2-hydroxy-ethyl or a radical of formula —$CH_2$—CH(OH)—$CH_3$.

In a preferred embodiment of the novel dye solutions, $R_1$, $R_2$ and $R_3$ are each independently of one another hydroxy-substituted $C_2$–$C_3$alkyl, preferably 2-hydroxyethyl or a radical of formula —$CH_2$—CH(OH)—$CH_3$ or a radical of formula —$(CH_2)_2$—O—$CH_2$—$CH(CH_3)$—OH.

In a very particularly preferred embodiment of the novel dye solutions, $R_1$, $R_2$ and $R_3$ are a radical of formula —$CH_2$—CH(OH)—CH.

The novel dye solutions preferably comprise 10 to 50% by weight and, more preferably, 20 to 50% by weight, of at least one dye of formula (1), based on the total weight of the solution.

Preferred dye solutions are those, which comprise two dyes of formula (1).

The novel dye solutions particularly preferably comprise two dyes of formula (3), (4) or (5)

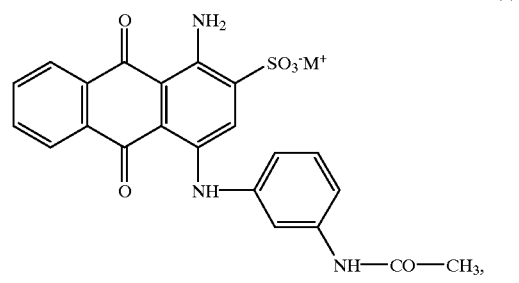

(3)

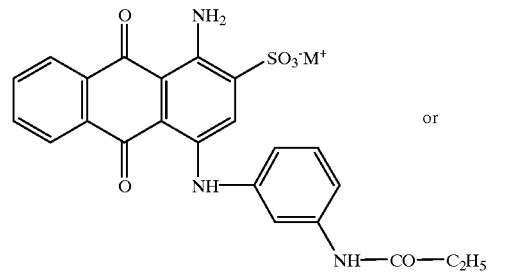

(4)

or

-continued

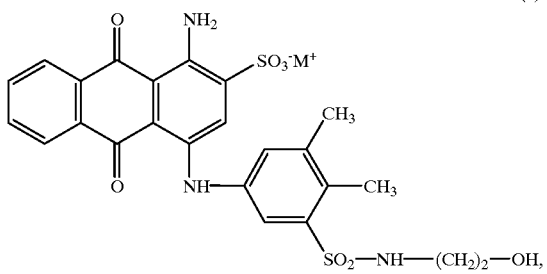

(5)

wherein
M⁺ has the meanings and preferred meanings defined above.

Thus, the novel dye solutions comprise, for example,
(i) a dye of formula (3) and a dye of formula (5),
(ii) a dye of formula (4) and a dye of formula (5), or
(iii) a dye of formula (3) and a dye of formula (4).

Very particularly preferred dye solutions according to (i) or (ii) are those which, based on the total amount of the dyes of formulae (3) and (5) or of formulae (4) and (5), comprise at least 5% by weight, preferably at least 10% by weight and, more preferably, at least 15% by weight, of a dye of formula (5).

Other very particularly preferred dye solutions according to (iii) are those which, based on the total amount of the dyes of formulae (3) and (4), comprise at least 5% by weight, preferably at least 10% by weight and, more preferably, at least 20% by weight, of a dye of formula (3).

This invention also relates to a process for the preparation of the novel dye solutions, which comprises dissolving at least one dye of formula (1), wherein M⁺ is a hydrogen ion, together with an amine of formula (2) in water, or dissolving at least one dye of formula (1), wherein
M⁺ is the ammonium cation

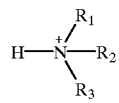

of an amine of formula (2), in water, X, Y, Z, $R_1$, $R_2$ and $R_3$ each independently of one another having the above meanings.

The dyes of formula (1), wherein M⁺ is a hydrogen ion, are known or can be prepared in analogy to known processes in a manner known per se.

The preparation is conveniently carried out by slurrying the free acids of the anthraquinone dyes of formula (1), wherein M⁺ is a hydrogen ion, in dry or moist form, for example in the form of the filter press cake obtained after synthesis, in water and then neutralising this slurry e.g. with an aqueous solution of the amine of formula (2) at a pH of e.g. 6 to 8, preferably of 6.5 to 7.5, at room temperature or at slightly elevated temperature, for example at 35 to 50° C., until a homogeneous solution forms. The preparation can, of course, also be carried out at a higher temperature. If required, the dye solution so obtained is clarified by filtration.

If appropriate, the water used for slurrying the dyes or, if an aqueous solution of the amine is used, the aqueous solution of the amine, may already comprise the above additives, expediently whenever the cited additives are in solid form at room temperature. The cited additives can also be added in the desired amounts after the dye acids have been slurried or neutralised. If the cited additives are in solid form at room temperature, they are conveniently dissolved in the required amount of water prior to addition.

The amount of the cited additives can vary within wide limits and depends on the solubility of the dye, on the amount of dye to be dissolved and on the structure of the amine used. The novel dye solutions comprising two dyes of of formula (1) are obtained, for example, by mixing first (i) the two dye acids in the desired mixture ratio, or (ii) by preparing a mixture of the two dye acids by reacting 1-amino-4-bromo-anthraquinone-2-sulfonic acid with two aromatic amines of formula (6)

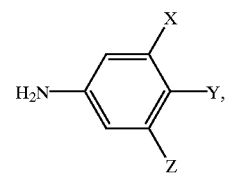

(6)

wherein
X, Y and Z have the meanings given above, and then processing the dry dye mixture according to (i) or the moist filter cake according to (ii), using the process described above.

In another of its aspects, this invention relates to dyes of formula (1), wherein X, Y, Z, $R_1$, $R_2$ and $R_3$ have the meanings and preferred meanings given above, with the proviso that $R_1$, $R_2$ and $R_3$ are not a radical of formula —CH₂—CH(OH)—CH₃ if X and Y are methyl and Z is 2-hydroxyethylsulfamoyl or if X and Y are hydrogen and Z is propionylamino.

Dyes of formula (1) can be obtained, for example, by reacting 1-amino-4-bromo-anthraquinone-2-sulfonic acid with an aromatic amine of formula (6) and then with an amine of formula (2). The first reaction is preferably carried out in aqueous solution at a temperature in the range from, for example, 50 to 100° C., preferably from 65 to 85° C., in the presence of e.g. copper chloride or copper sulfate. The reaction with an amine of formula (2) is carried out, for example, by neutralising an aqueous dye solution with the corresponding amine.

The novel dyes and the novel dye solutions comprising said dyes can be used in the customary dyeing and printing processes. Besides water and the dyes, the dye liquors or printing pastes can contain further additives, for example wetting agents, antifoams, levelling agents or agents affecting the properties of the textile material, for example softeners, additives for flameproof finishing, or dirt-, water- and oil-repelling agents, water softeners and natural or synthetic thickeners, for example alginates and cellulose ethers.

The novel dyes and the novel dye solutions containing said dyes are also suitable for dyeing from short liquors, for example in continuous dyeing processes or in batchwise and continuous foam dyeing processes.

The novel dyes are distinguished in particular by good exhaustion behaviour, good solubility and good stability of the printing paste as well as by good compatibility.

The dye solutions of this invention have good storage stability. They are storage-stable for several months in the temperature range from, for example, −5 to +40° C. and are substantially insensitive to variations in temperature.

The novel dye solutions furthermore have good resistance to hard water and, for example during the preparation of the dyeing liquor, can be diluted with water in any ratio without the dissolved dyes precipitating.

Level dyeings having good allround fastness properties are obtained, in particular having good fastness to rubbing, wetting, wet-rubbing and light.

The novel dyes and the novel dye solutions comprising said dyes are suitable for dyeing or printing hydroxyl group-containing or nitrogen-containing fibre material. They are particularly suitable for dyeing or printing natural polyamide materials, such as wool or, in particular, synthetic polyamide materials, such as polyamide 6 or polyamide 6.6, or silk, and they are also suitable for dyeing or printing blended fabrics or blended yarns of wool and synthetic polyamide.

The cited material, in particular textile material, can be in any form of presentation, for example in the form of fibre, yarn, wovens or knits and, in particular, in the form of carpets.

In the following Examples, parts are by weight and temperatures are given in degrees Celsius. The relationship between parts by weight and parts by volume is the same as that between the gramme and the cubic centimetre.

Example 1

A sulfonation flask is charged with 880 parts of water and then 382 parts of 1-amino-4-bromo-anthraquinone-2-sulfonic acid, 82 parts of 3-propionamidoaniline and 75 parts of 3-acetamidoaniline are added. After adding 201 parts of sodium hydrogencarbonate, the mixture is heated to 75° C. Stirring continuously, 1 part of copper and 1 part of copper chloride is added. The reaction is complete after about 6 hours. After adding 2180 parts of water and 345 parts of 32% HCL, the mixture is stirred for 30 minutes at 80° C. and the product obtained is collected by suction filtration and washed with a warm solution of 25 parts of HCl in 800 parts of water. This gives 780 parts of a still moist product which comprises the dyes of formulae (101) and (102)

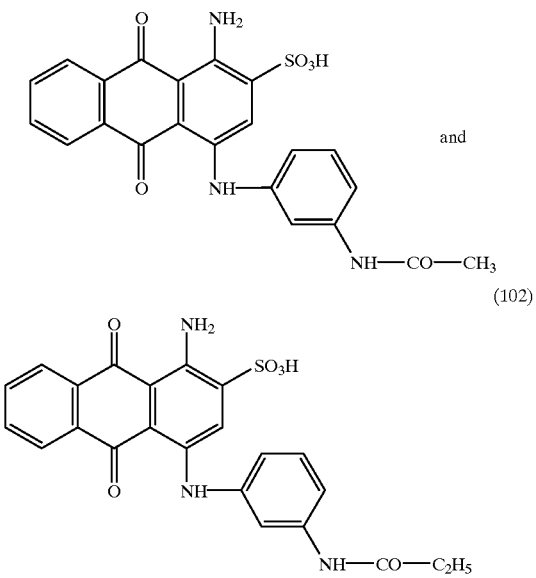

in a weight ratio of 50:50. 28.5 parts of the moist product are slurried in 31.1 parts of demineralised water and the resulting paste is neutralised with 10.1 parts of triethanolamine at a pH of 7 to 7.2. Subsequently, 30.0 parts of ε-caprolactam and 0.3 part of a commercially available bactericide are added and the dye solution is clarified by filtration. This liquid formulation has the following composition:

34.8% by weight of a mixture of the dyes of formulae (3) and (4) in the form of the salts of triethanolamine, the weight ratio of the dyes being as indicated above, 30.0% by weight of ε-caprolactam, 0.3% by weight of a commercially available bactericide, and 34.9% by weight of water.

Example 2

The procedure of Example 1 is repeated, but replacing 82 parts of 3-propionamidoaniline with 138 parts of 3-propionamidoaniline, and 75 parts of 3-acetamidoaniline with 51.2 parts of 5-amino-1,2-xylene-3-sulfo-2'-hydroxyethylamide, to give 840 parts of a still moist product which comprises the dyes of formulae (102) and (103)

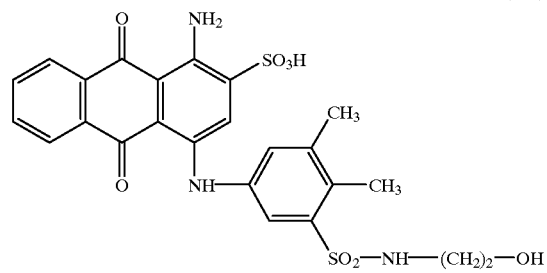

in a weight ratio of 80:20. 34.0 parts of the moist product are slurried in 50.6 parts of demineralised water and the resulting paste is neutralised with 15.1 parts of aqueous triisopropanolamine (66%) at a pH of 7 to 7.2. Subsequently, 0.3 part of a commercially available bactericide is added and the dye solution is clarified by filtration. This liquid formulation has the following composition:

37.7% by weight of a mixture of the dyes of formulae (4) and (5) in the form of the salts of triisopropanolamine, the weight ratio of the dyes being as indicated above, 0.3% by weight of a commercially available bactericide, and 62.0% by weight of water.

Example 3

The procedure of Example 1 is repeated, but replacing 82 parts of 3-propionamidoaniline with 43 parts of 3-propionamidoaniline, and 75 parts of 3-acetamidoaniline with 192 parts of 5-amino-1,2-xylene-3-sulfo-2'-hydroxyethylamide, to give 880 parts of a still moist product which comprises the dyes of formulae (102) and (103) in a weight ratio of 25:75. 35.0 parts of the moist product are then slurried in 25.0 parts of demineralised water and the resulting paste is neutralised with 15.0 parts of aqueous triisopropanolamine (66%) at a pH of 7 to 7.2. Subsequently, 20.0 parts of ε-caprolactam and 0.3 part of a commercially available bactericide are added and the dye solution is clarified by filtration. This liquid formulation has the following composition:

25.1% by weight of a mixture of the dyes of formulae (4) and (5) in the form of the salts of triisopropanolamine, wherein the weight ratio of the dyes is as indicated above, 20.0% by weight of ε-caprolactam, 0.3% by weight of a commercially available bactericide, and 54.6% by weight of water.

Example 4

The procedure of Example 1 is repeated, but replacing 82 parts of 3-propionamidoaniline with 128 parts of 5-amino-1,2-xylene-3-sulfo-2'-hydroxyethylamide, to give 860 parts of a still moist product which comprises the dyes of formulae (101) and (103) in a weight ratio of 50:50. 39.1 parts of the moist product are slurried in 28.3 parts of demineralised water and the resulting paste is neutralised with 7.3 parts of triethanolamine at a pH of 7 to 7.2. Subsequently, 25.0 parts of ε-caprolactam and 0.3 part of a commercially available bactericide are added and the dye solution is clarified by filtration. This liquid formulation has the following composition:

25.8% by weight of a mixture of the dyes of formulae (3) and (5) in the form of the salts of triethanolamine, wherein the weight ratio of the dyes is as indicated above, 25.0% by weight of ε-caprolactam, 0.3% by weight of a commercially available bactericide, and 48.9% by weight of water.

Example 5

37.0 parts of the moist product of the dyes of formulae (101) and (103) of Example 4 are slurried in 28.4 parts of demineralised water and the resulting paste is then neutralised with 14.3 parts of aqueous triisopropanolamine (66%) at a pH of 7 to 7.2. 20.0 parts of ε-caprolactam and 0.3 part of a commercially available bactericide are then added and the dye solution is clarified by filtration. This liquid formulation has the following composition:

27.5% by weight of a mixture of the dyes of formulae (3) and (5) in the form of the salts of triethanolamine, wherein the weight ratio of the dyes is as indicated above, 20.0% by weight of ε-caprolactam, 0.3% by weight of a commercially available bactericide, and 52.2% by weight of water.

The formulations obtained in accordance with Examples 1 to 5 are storage-stable in the temperature range from −5 to +40° C. and dye polyamide fabric in a blue shade.

Replacing the triethanolamine of Examples 1 and 4 and the aqueous triisopropanolamine of Examples 2, 3 and 5 each by an equimolar amount of the amine of formula N-[(CH$_2$)$_2$—O—CH$_2$—CH(CH$_3$)—OH]$_3$ and not adding the ε-caprolactam used in Examples 1, 3, 4 and 5 also gives formulations which are storage-stable in the temperature range from −5 to +40° C. and which dye polyamide fabric in a blue shade.

Example 6

A sulfonation flask is charged with 880 parts of water and then 382 parts of 1-amino-4-bromo-anthraquinone-2-sulfonic acid and 158 parts of 3-acetamidoaniline are added. After adding 200 parts of sodium hydrogencarbonate, the mixture is heated to 75° C. Stirring continuously, 1 part of copper and 1 part of copper chloride are added. The reaction is complete after about 6 hours. Subsequently, 2180 parts of water and 345 parts of 32% HCL are added. The mixture is stirred for 30 minutes at 80° C. and the product obtained is collected by suction filtration and washed with a warm solution of 25 parts of HCl in 800 parts of water. This gives 750 parts of a still moist product which comprises 36.5% by weight of the dye of formula (101).

67.2 parts of the moist product are slurried in 4.2 parts of demineralised water and the resulting paste is then neutralised with 27.3 parts of the amine of formula N-[(CH$_2$)$_2$—O—CH(CH$_3$)CH$_2$—OH]$_3$ at a pH of 7.0. Subsequently, 0.3 part of a commercially available bactericide (®Proxel GXL, of Zeneca) and 1 part of a commercially available penetration accelerator (®Albegal FFA, of Ciba Specialty Chemicals AG) are added and the dye solution is clarified by filtration. This liquid formulation has the following composition:

51.2% by weight of the dye of formula (101) in the form of the salts of tris(hydroxyisopropoxyethyl)amine, 0.3% by weight of a commercially available bactericide, 1.0% by weight of a commercially available penetration accelerator, and 47.5% by weight of water.

The formulation obtained is storage-stable in the temperature range from −5 to +40° C. and dyes polyamide fabric in a blue shade.

Dyeing Example I 10 parts of polyamide 6.6 fabric are dyed in 500 parts of an aqueous liquor containing 2 g/l of ammonium acetate and which is adjusted to pH 5 with acetic acid. The amount of the liquid formulation of Example 1 is 2%, based on the weight of the fibre. The dyeing time is 30 to 90 minutes at 98° C. The dyed polyamide 6.6 fabric is then taken out of the liquor and washed and dried as usual.

Dyeing Example II 10 parts of polyamide 6.6 fabric are dyed in 500 parts of an aqueous liquor containing 1 g/l of monosodium phosphate and which is adjusted to pH 6 with disodium phosphate. The amount of the liquid formulation of Example 1 is 2%, based on the weight of the fibre. The dyeing time is 30 to 90 minutes at 98° C. The dyed polyamide 6.6 fabric is then taken out of the liquor and washed and dried as usual.

Dyeing Example III 10 parts of woollen piece goods are dyed in 500 parts of an aqueous liquor. The liquor contains 2% of the liquid formulation according to Example 1, 5% of calcined Glauber's salt and 2% of 80% acetic acid, based on the weight of the fibre. The dyeing time ist 30 to 60 minutes at 98° C.

What is claimed is:

1. A concentrated aqueous dye solution, which comprises 5 to 50% by weight, based on the total weight of the solution, of at least one dye of formula (1)

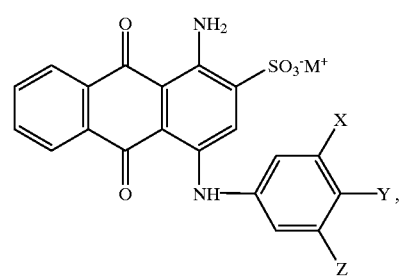

(1)

wherein X and Y are each independently of the other hydrogen or $C_1$–$C_4$alkyl or $C_1$–$C_4$alkoxy, and Z is $C_2$–$C_6$alkanoylamino or $C_2$–$C_4$hydroxyalkylsulfamoyl, M$^+$ is the ammonium cation

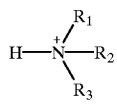

of an amine of formula

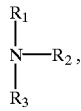                                    (2)

wherein $R_1$, $R_2$ and $R_3$ are each a radical of formula —$(CH_2)_2$—O—$CH_2$—$CH(CH_3)$—OH or a radical of formula —$(CH_2)_2$—O—$CH(CH_3)$—$CH_2$—OH.

2. A dye solution according to claim 1, which further comprises caprolactam or N-methylpyrrolidone.

3. A dye solution according to claim 1, wherein X and Y are each independently of the other hydrogen or methyl, and Z is $C_2$–$C_4$alkanoylamino or $C_2$–$C_4$hydroxyalkylsulfamoyl.

4. A dye solution according to claim 1, wherein X and Y are each independently of the other hydrogen or methyl, and Z is acetylamino, propionylamino or 2-hydroxyethylsulfamoyl.

5. A dye solution according to claim 1, which comprises 10 to 50% by weight, of at least one dye of formula (1).

6. A dye solution according to claim 1, which comprises two dyes of formula (1).

7. A dye solution according to claim 1, which comprises two dyes of formula (3), (4) or (5)

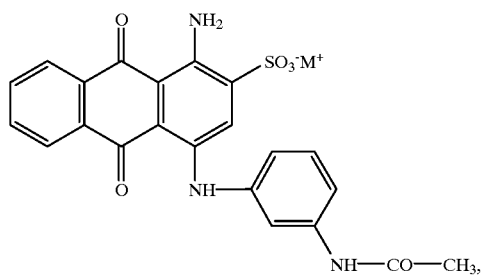                                    (3)

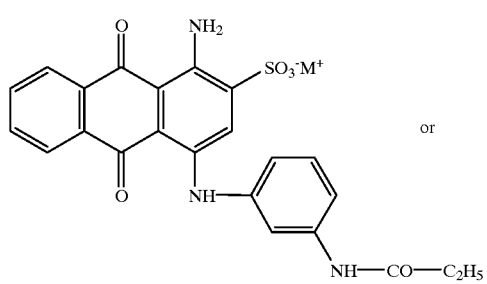                                    (4)

or

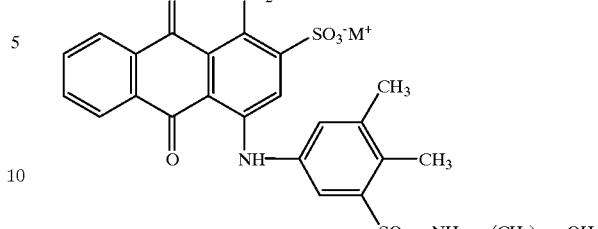                                    (5)

wherein $M^+$ is the ammonium cation

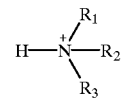

of an amine of formula

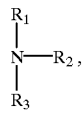                                    (2)

wherein $R_1$, $R_2$ and $R_3$ are each a radical of formula —$(CH_2)_2$—O—$CH_2$—$CH(CH_3)$—OH or a radical of formula —$(CH_2)_2$—O—$CH(CH_3)$—$CH_2$—OH.

8. A process for the preparation of a dye solution according to claim 1, which comprises dissolving at least one dye of formula

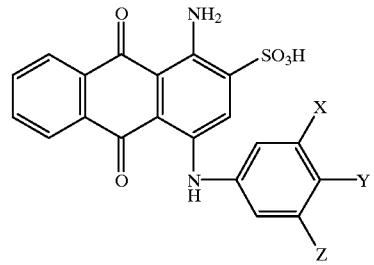

together with an amine of formula (2) in water, or dissolving in water at least one dye of formula (1), wherein X and Y are each independently of the other hydrogen or $C_1$–$C_4$alkyl or $C_1$–$C_4$alkoxy, Z is $C_2$–$C_6$alkanoylamino or $C_2$–$C_4$hydroxyalkylsulfamoyl, $M^+$ is the ammonium cation

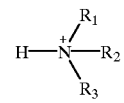

of an amine of formula (2), and $R_1$, $R_2$ and $R_3$ are each a radical of formula —$(CH_2)_2$O—$CH_2$—$CH(CH_3)$—OH or a radical of formula —$(CH_2)_2$—O—$CH(CH_3)$—$CH_2$—OH.

9. Method for dyeing or printing hydroxyl group-containing or nitrogen-containing fibre material, said method comprising the step of contacting said fibre material with the dye solution according to claim 1.

10. Method according to claim 9 wherein said fibre material is a polyamide fibre material.

11. Method according to claim 10 wherein said fibre material is a synthetic polyamide fibre material.

12. A dye solution according to claim 9, which comprises 20 to 50% by weight of at least one dye of formula (1).

13. A dye of formula (1)

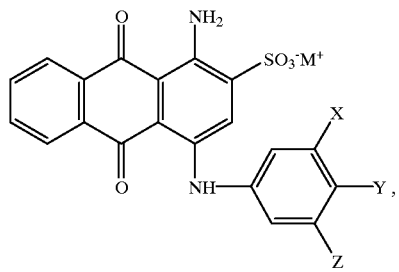

(1)

wherein X and Y are each independently of the other hydrogen or $C_1$–$C_4$alkyl or $C_1$–$C_4$alkoxy, and Z is $C_2$–$C_6$alkanoylamino or $C_2$–$C_4$hydroxyalkylsulfamoyl, $M^+$ is the ammonium cation

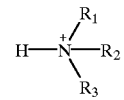

of an amine of formula

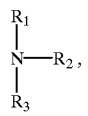

(2)

wherein $R_1$, $R_2$ and $R^3$ are each a radical of formula —$(CH_2)_2$—O—$CH_2$—$CH(CH_3)$—OH or a radical of formula —$(CH_2)_2$—O—$CH(CH_3)$—$CH_2$—OH.

* * * * *